(12) United States Patent
Basile et al.

(10) Patent No.: US 6,619,136 B2
(45) Date of Patent: Sep. 16, 2003

(54) METHOD FOR MEASURING STRESS IN A STRUCTURAL ELEMENT

(75) Inventors: Bernard Basile, Plaisir (FR); Sébastien Lardy, Paris (FR); Jérôme Stubler, Paris (FR)

(73) Assignee: Freyssinet International (STUP) (FR)

( * ) Notice: Subject to any disclaimer, the term of this patent is extended or adjusted under 35 U.S.C. 154(b) by 20 days.

(21) Appl. No.: 10/048,271

(22) PCT Filed: Jul. 24, 2001

(86) PCT No.: PCT/FR01/02416

§ 371 (c)(1),
(2), (4) Date: Jan. 28, 2002

(87) PCT Pub. No.: WO02/14819

PCT Pub. Date: Feb. 21, 2002

(65) Prior Publication Data

US 2003/0005776 A1 Jan. 9, 2003

(51) Int. Cl.[7] .................................................. G01N 3/00
(52) U.S. Cl. .............................. 73/803; 73/760; 73/839
(58) Field of Search ......................... 73/788, 838, 839, 73/803, 804, 805, 806, 807, 760

(56) References Cited

U.S. PATENT DOCUMENTS 4,730,497 A * 3/1988 Rabensteiner et al. ........ 73/803
4,823,610 A * 4/1989 Adini ........................... 73/828

FOREIGN PATENT DOCUMENTS

FR 2 717 576 9/1995
GB 2 284 669 6/1995

* cited by examiner

*Primary Examiner*—Edward Lefkowitz
*Assistant Examiner*—Alandra N. Ellington
(74) *Attorney, Agent, or Firm*—Cantor Colburn LLP

(57) ABSTRACT

Displacement measuring means are fixed onto the structural element. A hole is drilled in the measurement zone and a supply pressure is applied to a flat actuator introduced into the hole. The displacements measured are analyzed as a function of the supply pressure to determine the stress from a supply pressure which roughly compensates for the deformation of the element due to the drilling of the hole. The measuring means comprise two arms that are fixed to the element at two respective anchoring points aligned parallel to a measuring direction, and at least two displacement sensors mounted on the arms on each side of the anchoring points to measure the variations in separation between the anchoring points. The arms leave between them a gap through which the hole is drilled at a central position with respect to the anchoring points.

15 Claims, 2 Drawing Sheets

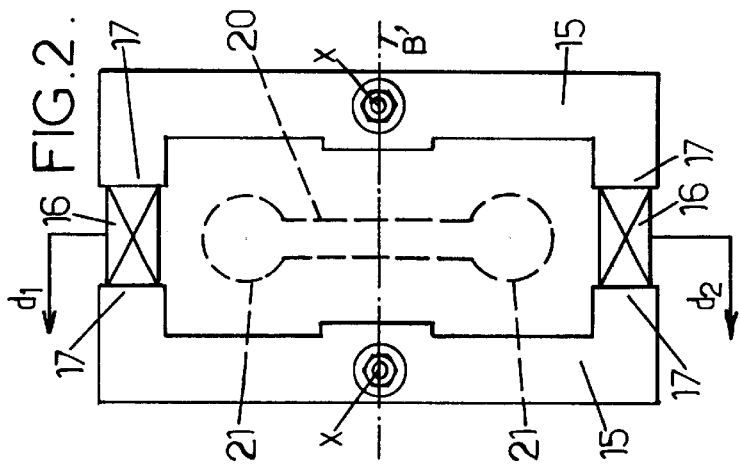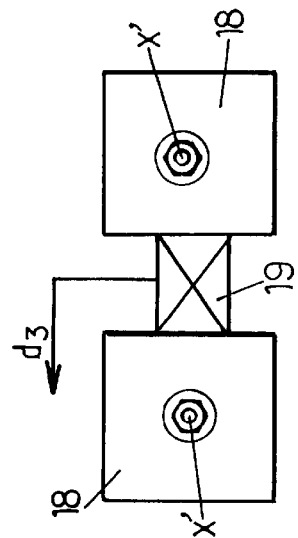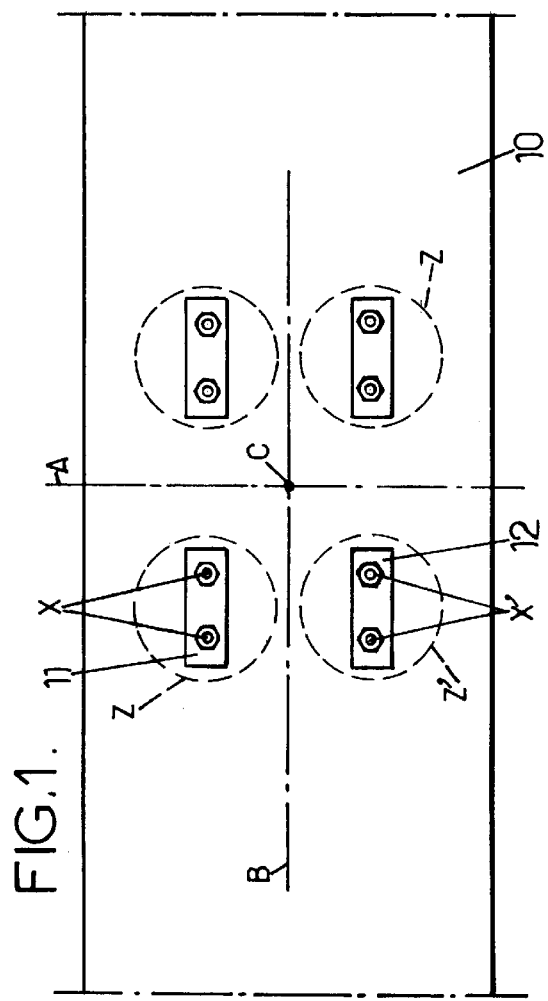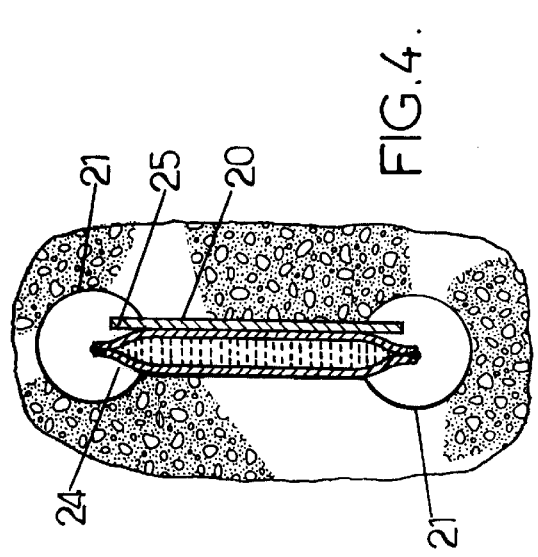

METHOD FOR MEASURING STRESS IN A STRUCTURAL ELEMENT

FIELD OF INVENTION

The present invention relates to a method for measuring stress in a structural element.

DESCRIPTION OF THE RELATED ART

It applies in particular, although not exclusively, to the measurement of residual prestress in a component of a concrete structure subjected to a bending force due to the load on the structure and, on the other hand, to a compressive prestress. Such a component is typically a prestressed concrete beam.

A prestressed beam comprises steel cables tensioned between their ends, with enough force that the concrete of the beam is subjected only to compressive stresses, in spite of the bending forces which are due to the loads it supports.

Over the course of time, the tension in the prestressing cables tends to decrease, which means that the compressive stresses generated by these cables may become insufficient to compensate for the tensile stresses due to the bending of the beams. These tensile stresses may lead to cracking of the concrete or even to the breaking of the beams.

It is therefore useful to be able to monitor the residual value of the compressive stresses generated by the prestressing cables, so as to be able to take appropriate action should that prove necessary.

French Patent 2 717 576 describes a method of measuring a residual prestress in a reinforced concrete beam which is subjected to a vertical bending force and to a compressive longitudinal prestress force, any section of the beam having a transverse line, known as the neutral axis of bending, along which the bending forces generate neither tensile stress nor compressive stress. This known method comprises the following steps:

determining the position of the neutral bending axis in a given section of the beam;

boring along said neutral bending axis, passing transversely through the beam, this boring giving rise to a certain elastic deformation of the beam in its vicinity;

measuring the deformation of the beam near the boring, with respect to an initial state prior to the bore hole being pierced;

introducing into the bore hole a hydraulic actuator comprising two roughly semicylindrical shells which occupy roughly the entire cross section of the bore hole and which are designed to move apart when the actuator is pressurized, this actuator being arranged in such a way that the two shells can move apart parallel to the prestress force;

pressurizing the hydraulic actuator while at the same time measuring the deformation of the beam near the bore hole;

recording the hydraulic pressure of the actuator which corresponds to the deformation of the beam due to the bore hole being canceled;

and determining the mean residual prestress along the neutral bending axis from the hydraulic pressure value thus measured.

One object of the present invention is to improve this method, by allowing better control over the relationships between the stress and the displacements measured.

BRIEF SUMMARY OF THE INVENTION

The invention thus proposes a method for measuring stress in a structural element, comprising the following steps:

fixing displacement measuring means onto the element in a measurement zone;

piercing a hole in the element in the measurement zone;

introducing an actuator into the hole;

applying a supply pressure to the actuator; and analyzing the displacements measured as a function of the actuator supply pressure so as to estimate the degree of stress in the element in the measurement zone.

According to the invention, the displacement measuring means comprise two arms that are fixed to the element at two respective anchoring points aligned parallel to a measuring direction, and at least two displacement sensors mounted on the arms on each side of the anchoring points and each measuring a relative displacement, parallel to the measuring direction, of two respective portions of the arms which portions lie facing one another. The arms leave between them a gap through which the hole is pierced at a central position with respect to the anchoring points.

Thus, the anchoring points which act as a basis for the displacement measurements are positioned optimally with respect to the hole and to the measuring direction, without this in any way impeding the boring of the hole and the instrumenting of the measurement zone.

The method makes it possible in a particularly advantageous way to constantly record the displacement and supply pressure measurements while the hole is being pierced and the supply pressure is being applied to the actuator, this allowing in-depth analysis of the results.

In a preferred embodiment, the hole comprises a slot orientated at right angles to the measuring direction, symmetrically with respect to an axis passing through the anchoring points, the actuator being a flat actuator introduced into the slot.

The fact that the slot and the measurement axis are at right angles to each other and the fact that the slot is centered with respect to the anchoring points improve the reliability of the displacement measurements and improve their correlation with the looked-for stress.

This slot may pass all the way through the element, but that is not essential as long as it is deep enough.

The flat actuator may be supplied with hydraulic fluid by a manually operated pump and associated with means of measuring the supply pressure.

The flat actuator may be introduced into the slot with the insertion of at least one wedging plate which makes the distribution of the force exerted by the actuator uniform over the extent of the slot.

The displacements analyzed advantageously represent a variation in separation between the two anchoring points, which variation is obtained from a mean of the displacements respectively measured by the sensors. In a preferred embodiment, additional displacement measuring means are fixed to the structural element at two anchoring points lying outside of the measuring zone and aligned in the measuring direction and having, between them, a distance roughly identical to the distance between the two anchoring points lying in the measurement zone. These additional measurement means provide a corrective term that represents a variation in separation between the two anchoring points lying outside the measurement zone, said corrective term being subtracted from said mean of the displacements in the analysis step.

In some particular embodiments of the method:

the displacement sensors have a measurement accuracy of the order of one micron;

the supply pressure of the actuator is increased until a supply pressure is achieved that roughly compensates for the deformation of the element that is due to the piercing of the hole, then the supply pressure has gradually reduced while continuing to record the displacement measurements, and a degree of compression in the measurement zone is estimated from the supply pressure which has roughly compensated for the deformation of the element;

the change in the measured displacements is recorded as a function of the supply pressure of the actuator, and if a supply pressure which roughly compensates for the deformation of the element due to the piercing of the hole is not achieved, the change in the measured displacements is extrapolated so as to estimate the degree of stress in the element in the measurement zone; if extrapolation is toward high pressures, it can then be determined that the measurement zone is in a state of compression, while it can be determined that the measurement zone is in a state of tension, if extrapolation is toward negative pressures;

once the measurements have been taken, an actuator containing a substance under pressure is left in the hole;

use is made of a measurement zone situated roughly along the neutral axis of the structural element;

use is made of at least two measurement zones situated roughly symmetrical with respect to the neutral axis of the structural element, and in which a stress is evaluated along the neutral axis using a mean of the stresses measured in said measurement zones.

BRIEF DESCRIPTION OF DRAWINGS

Other specifics and advantages of the present invention will become apparent from the description hereinafter of some nonlimiting embodiments, with reference to the appended drawings, in which:

FIG. 1 is a front view of a beam on which stress measurements will be taken according to the invention;

FIG. 2 is a schematic front view of displacement measuring means lying in the stress measurement zone;

FIG. 3 is a schematic front view of other displacement measuring means lying outside of the stress measurement zone;

FIG. 4 is a sectional view of the measurement zone;

DETAILED DESCRIPTION OF THE INVENTION

Figure 5:
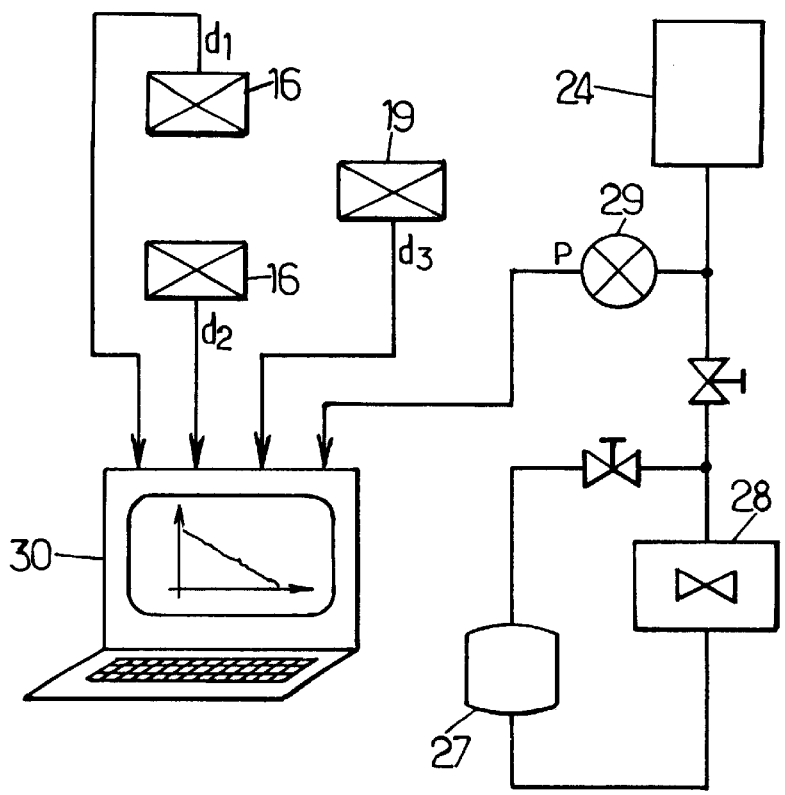
FIG. 5 is a block diagram of a control and measurement sequence that can be used in the method.

FIG. 1 illustrates the application of the invention to the measurement of the residual prestress in a prestressed reinforced concrete beam 10. On its top face, this beam 10 is subjected to variable loads which tend to cause it to bend, in additional to its self-weight. In consequence, in the upper part of the beam, the loads induce compressive (positive) stresses in the concrete, whereas they induce tensile (negative) stresses in the concrete of the lower part of the beam.

The line B in FIG. 1 indicates the neutral axis of the beam, that is to say the axis for which the stresses induced by the loads it supports and by its self weight change sign. For the concrete to work properly, prestressing cables longitudinally compress the beam so that the overall stress along the neutral axis B corresponds to a positive compressive stress.

In FIG. 1, the line A indicates an axis of symmetry of the beam 10 and the point C denotes its intersection with the neutral axis B.

To measure the residual stress in the concrete at the neutral axis (point C) use is made, in the example depicted in FIG. 1, of two measurement zones Z arranged symmetrically with respect to the point C.

In each measurement zone Z, a value of the compressive stress parallel to the direction B is determined. To obtain the value of the residual stress at the point C, all that is required is for an arithmetic mean of the two measured values to be calculated.

If the point C is accessible, it is also possible to take just one measurement in its immediate vicinity.

A first step in the stress measuring method consists in defining two anchoring points X in the measurement zone Z. These two anchoring points are aligned parallel to the measuring direction B and their distance is defined precisely using a template 11 with two openings through which holes are pierced, in which holes anchor bolts are installed.

Each measurement zone Z is associated with a reference zone Z' in which two other anchoring points X' are defined, these too being aligned parallel to the direction B and having between them the same distance as there is between the anchoring points X. The anchoring points X' may be positioned using a template 12 similar to the one used in the measurement zone Z.

The next step consists in equipping the measurement zone Z with displacement measuring means such as those depicted in FIG. 2.

These means comprise two arms 15 fixed respectively in their central part to rods sealed into the holes pierced in the concrete at the anchoring points X. The arms 15 run in a direction which is generally at right angles to the measuring direction B. Their ends are bent inward, and displacement sensors 16 are inserted between the facing portions 17 of the bend ends of the arms 15.

The sensors 16 may be electromechanical feelers with a measurement accuracy of the order of one micron in a range of displacement of ±1 mm.

The two sensors 16 are arranged symmetrically with respect to the axis B' passing through the two anchoring points X, which is parallel to the measuring direction B. Thus, the arithmetic mean $(d_1+d_2)/2$ of the two displacement measurements $d_1$, $d_2$ supplied by the sensors 16 represents a measure of the variation in separation between the two anchoring points X.

Additional displacement measuring means (FIG. 3) are installed in the reference zone Z'. These means comprise two platelets 18 fixed respectively to rods sealed into the holes pierced in the concrete at the two anchoring points X'. A displacement sensor 19 similar to those 16 provided in the measurement zones Z is arranged between the two platelets 18. The displacement value $d_3$ supplied by this sensor 19 represents the variation in separation between the two anchoring points X'.

The next step in the method consists in piercing a hole 20, 21 in the concrete element 10 in the measurement zone Z. This hole is pierced through the gap left free between the two arms 15 of the displacement measuring device, as illustrated in dotted line in FIG. 2.

This hole comprises a slot 20 directed at right angles to the measuring direction B. This slot 20 is centered between the two anchoring points X, and the axis B' passing through these two anchoring points X passes through the middle of the slot 20. The slot 20 may have a thickness of the order of one centimeter and a length of about ten times that.

At the two ends of the slot 20, the hole made in the measurement zone Z has two cylindrical bore holes 21, the diameter of which is, for example, of the order of a few centimeters.

To drill the hole 20, 21, the bore holes 21 are made first of all using a hydraulic concrete core drill, then the slot 20 is made using a hydraulic concrete cutter. The core drill and the cutter may be mounted on a chassis that is anchored to the concrete structure.

The hole 20, 21 may pass right through the beam 10. In some cases, it may penetrate the concrete to a sufficient depth without passing through it.

The next step (FIG. 4) consists in introducing a flat actuator 24 into the slot 20. This actuator may consist of two metal plates welded together along their periphery. An injection orifice, not depicted, causes the space between the two plates to communicate with a hydraulic circuit. As shown by FIG. 4, a wedging sheet 25 of appropriate thickness (or a stack of several sheets) may be placed, with the flat actuator 24, in the slot 20. This plate 25 allows more uniform distribution of the thrust exerted by the flat actuator 24 across the extent of the slot 20.

The hydraulic circuit is depicted schematically in FIG. 5. The hydraulic fluid from the reservoir 27 is sent under pressure to the flat actuator 24 by a pump 28. By way of example, the supply pressures may range up to about 200 to 300 bar. A pressure gauge 29 situated between the pump 28 and the actuator 24 is used to measure the actuator supply pressure. To reach high pressures with a gradual pressure rise, the pump 28 is advantageously manually operated.

FIG. 5 also shows a computation device 30 consisting, for example, of a portable computer of the PC type, which gathers the various parameters measured by the sensors 16, 19 and 29. The computation device 30 exploits the displacement and pressure measurements to evaluate the stress exerted in the measurement zone Z. This exploitation may be done in real time, which means that the stress measurement is available immediately.

The data recorded by the computation device 30 correspond to the change in the separation between the two anchoring points X as a function of the supply pressure P applied to the flat actuator 24. The separation $(d_1+d_2)/2$ measured between the two anchoring points X is corrected using the separation $d_3$ measured between the anchoring points X'. The relevant displacement variable is therefore $(d_1+d_2)/2-d_3$.

Figure 6:
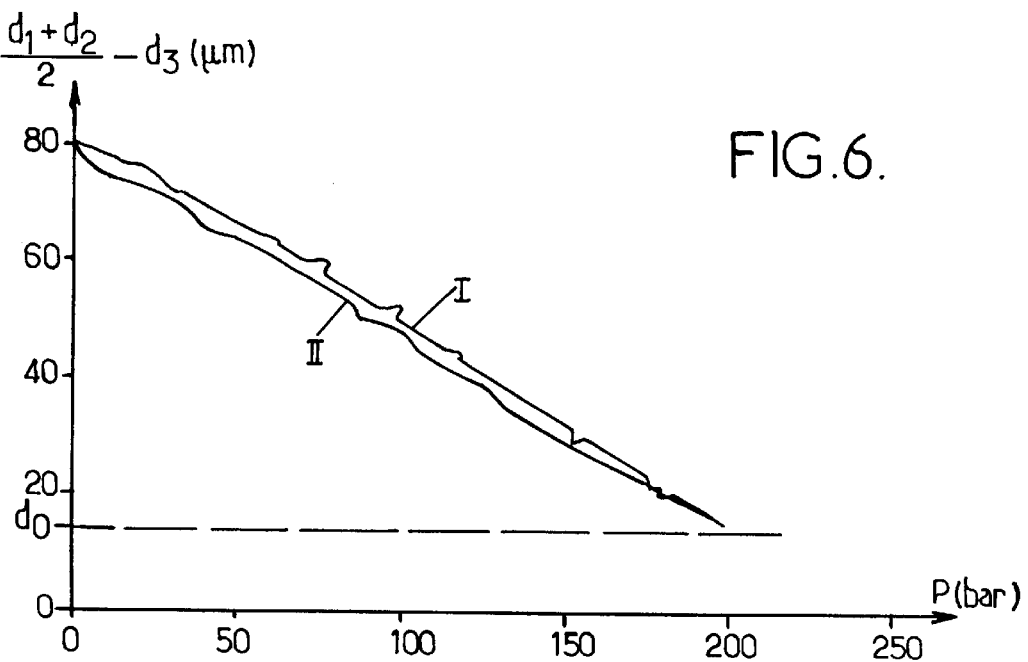
FIG. 6 shows an example of a graph generated according to the method.

An example of the change in this variable $(d_1+d_2)/2-d_3$ as a function of pressure is illustrated by the graph in FIG. 6. Curves I and II correspond respectively to the rise in pressure in the flat actuator 24 and to the fall in pressure. The rise is halted when the measured variable $(d_1+d_2)/2-d_3$ reaches the displacement value $d_0$ that corresponds to the value recorded before the hole was pierced. The pressure P measured at that instant corresponds to the looked-for compressive stress.

If the displacement value $d_0$ has not yet been reached when the actuator 24 is supplied with its maximum pressure, then the computer 30 extrapolates the curve obtained, which is approximately linear, to obtain a measure of the stress given by the X-axis value of the point of intersection of the extrapolated line with the y-axis value $d_0$.

The variations in displacement as a function of supply pressure are also recorded while the hole 20, 21 is being pierced, and this makes it possible to observe the behavior of the structure and possibly to estimate how deep the holes need to go, this being the depth beyond which the additional displacements measured at the anchoring points are no longer significant.

The fact of arranging the flat actuator 24 in a slot 20 perpendicular to the measuring direction B allows reliable measuring in that direction, avoiding the geometric configuration of the hole causing other undesirable stresses to be taken into consideration. The bore holes 21 at the ends of the slots 20 limit parasitic stresses at the ends and make the slot 20 easier to cut. They may also make it easier for the equipment to be fitted.

The making of the hole 20, 21 does not generally disturb the structure, given its small size. However, if such disturbance is feared, this may be overcome by leaving in the hole, once the measures have been taken, an actuator containing a pressurized substance. This substance is, for example, a resin injected into the flat actuator 24 at a pressure corresponding to the measured residual stress, which is left to cure in the actuator which will remain in situ.

It should be noted that the method may also be applied when the measurement zone is in a state of tension rather than of compression. In this case, the relaxation that follows the piercing of the hole tends to cause the arms 15 to move apart rather than to move closer together as is the case with compressive stresses (FIG. 6). Furthermore, when the actuator is supplied, it introduces an additional separation which moves the measurement point $(d_1+d_2)/2-d_3$ even further away from the reference value $d_o$. This does not prevent the degree of stress in the measurement zone from being estimated using the aforementioned process of extrapolation. Quite simply, extrapolation is toward the negative pressures (rather than toward the higher pressures). The opposite X-axis value at which the extrapolated measurement straight line reaches the y-axis value $d_0$ in a diagram according to FIG. 6 gives an estimate of the tensile stress.

Furthermore, the method can be applied to all types of structure, which are not necessarily made of concrete, for example to stonework structures.

What is claimed is:

1. A method for measuring stress in a structural element, comprising:

fixing displacement measuring means onto the element in a measurement zone drilling a hole in the element in the measurement zone;

introducing an actuator into the hole;

applying a supply pressure to the actuator; and analyzing the displacements measured as a function of the actuator supply pressure so as to estimate a degree of stress in the element in the measurement zone, wherein the displacement measuring means comprise two arms fixed to the element at two respective anchoring points aligned parallel to a measuring direction, and at least two displacement sensors mounted on the arms on each side of the anchoring points and each measuring a relative displacement, parallel to the measuring direction, of two respective portions of the arms which portions lie facing one another, and wherein the arms have a gap therebetween, the hole being drilled through said gap at a central position with respect to the anchoring points.

2. The method as claimed in claim 1, wherein the hole comprises a slot orientated at right angles to the measuring direction, symmetrically with, respect to an axis passing through the anchoring points and wherein the actuator is a flat actuator introduced into the slot.

3. The method as claimed in claim 2, wherein the hole further comprises two cylindrical bore holes situated one at each of the two ends of the slot and having a diameter greater than a thickness of the slot.

4. The method as claimed in claim 2, wherein the flat actuator is supplied with hydraulic fluid by a manually operated pump and is associated with means of measuring the supply pressure.

5. The method as claimed in claim 2, wherein the flat actuator is introduced into the slot with the insertion of at least one wedging plate.

6. The method as claimed in claim 1, wherein the displacements analyzed represent a variation in separation between the two anchoring points, said variation being obtained from a mean value of the displacements respectively measured by the sensors.

7. The method as claimed in claim 6, wherein additional displacement measuring means are fixed to the structural element at two additional anchoring points lying outside of the measuring zone and aligned in the measuring direction, the additional anchoring points being separated by a distance substantially identical to the distance between the two anchoring points lying in the measurement zone, and wherein the additional measurement means provide a corrective term that represents a variation in separation between the two anchoring points lying outside the measurement zone, said corrective term being subtracted from said mean value of the displacements in said analyzing said displacements.

8. The method as claimed in claim 1, wherein the displacement sensors have a measurement accuracy of the order of one micron.

9. The method as claimed in claim 1, wherein the displacement and supply pressure measurements are constantly recorded while the hole is being drilled and while the supply pressure is being applied to the actuator.

10. The method as claimed in claim 1, wherein the supply pressure of the actuator is increased up to a pressure that substantially compensates for a deformation of the element due to the drilling of the hole, then the supply pressure is gradually reduced while continuing to record the displacement measurements, and a degree of compression in the measurement zone is estimated from the supply pressure which has substantially compensated for the deformation of the element.

11. The method as claimed in claim 1, wherein the change in the measured displacements is recorded as a function of the supply pressure of the actuator, and if a supply pressure which substantially compensates for a deformation of the element due to the drilling of the hole is not achieved, the change in the measured displacements is extrapolated so as to estimate the degree of stress in the element in the measurement zone.

12. The method as claimed in claim 11, wherein the measurement zone is determined to be in a state of compression when extrapolation is toward high pressures, while the measurement zone is determined to be in a state of tension when extrapolation is toward negative pressures.

13. The method as claimed in claim 1, wherein, once the measurements have been taken, an actuator containing a substance under pressure is left in the hole.

14. The method as claimed in claim 1, wherein use is made of a measurement zone situated substantially along a neutral axis of the structural element.

15. The method as claimed in claim 1, wherein use is made of at least two measurement zones situated substantially symmetrical with respect to a neutral axis of the structural element, and wherein a stress is evaluated at a center of gravity using a mean value of the stresses measured in said measurement zones.

* * * * *